US010613203B1

United States Patent
Rekow et al.

(10) Patent No.: US 10,613,203 B1
(45) Date of Patent: Apr. 7, 2020

(54) INTERFERENCE MITIGATION FOR LIGHT DETECTION AND RANGING

(71) Applicant: Velodyne Lidar, Inc., Alameda, CA (US)

(72) Inventors: Matthew Rekow, Alameda, CA (US); Stephen Nestinger, Fremont, CA (US); Aaron Chen, Fremont, CA (US)

(*) Notice: Subject to any disclaimer, the term of this patent is extended or adjusted under 35 U.S.C. 154(b) by 0 days.

(21) Appl. No.: 16/459,557

(22) Filed: Jul. 1, 2019

(51) Int. Cl.
G01S 7/00 (2006.01)
G01S 7/487 (2006.01)
G01S 17/10 (2020.01)

(52) U.S. Cl.
CPC ............ G01S 7/4876 (2013.01); G01S 17/10 (2013.01)

(58) Field of Classification Search
USPC ...................................... 356/5.01
See application file for complete search history.

(56) References Cited

U.S. PATENT DOCUMENTS

| | | | |
|---|---|---|---|
| 5,177,768 A * | 1/1993 | Crespo | H04J 13/00 370/210 |
| 5,563,706 A * | 10/1996 | Shibuya | G01B 9/02039 356/495 |
| 6,201,236 B1 * | 3/2001 | Juds | G01S 17/936 180/274 |
| 6,742,707 B1 * | 6/2004 | Tsikos | B82Y 15/00 235/462.01 |
| 7,131,586 B2 * | 11/2006 | Tsikos | B82Y 15/00 235/454 |
| 10,309,213 B2 * | 6/2019 | Barfoot | G01V 8/02 |
| 2004/0134879 A1 * | 7/2004 | Kochergin | B82Y 20/00 216/24 |
| 2005/0023353 A1 * | 2/2005 | Tsikos | B82Y 15/00 235/454 |
| 2011/0028859 A1 * | 2/2011 | Chian | A61B 5/04001 600/554 |
| 2014/0078519 A1 * | 3/2014 | Steffey | G01S 7/4817 356/625 |
| 2015/0144806 A1 * | 5/2015 | Jin | G01N 21/6408 250/461.2 |
| 2018/0058197 A1 * | 3/2018 | Barfoot | G01V 8/02 |

* cited by examiner

Primary Examiner — James R Hulka
(74) Attorney, Agent, or Firm — Goodwin Procter LLP

(57) ABSTRACT

Methods, apparatus, and systems related to light detection and ranging (LIDAR) are described. In one example aspect, a LIDAR apparatus includes a light emitter configured to generate, according to a first electrical pulse signal, a pulse light signal. The first electrical pulse signal comprises a first set of non-uniformly spaced pulses. The apparatus includes a receiver configured to convert returned light signals from the object into electrical signals and a filtering subsystem in communication with the receiver, configured to receive the electrical signals from the receiver and remove a point from a set of points representing at least a partial surface of the object as noise by determining whether there is a coherence between the point and corresponding neighboring points of the point along at least a first direction and a second direction of the set of points.

29 Claims, 10 Drawing Sheets

INTERFERENCE MITIGATION FOR LIGHT DETECTION AND RANGING

BACKGROUND

Light Detection and Ranging (LIDAR) is a remote sensing method that uses light in the form of a pulsed laser to measure variable distances to the environment. LIDAR systems have a wide range of applications including autonomous driving and aerial mapping of a surface. These applications may place a high priority on the security, accuracy and reliability of the operation. The disclosed embodiments provide methods and systems to reduce or minimize signal interference when multiple LIDAR sensors are present, thereby generating reliable data for determining surface features of the environment. The additional features and benefits of the disclosed technology, as well as their further applications and implementations, are described in the sections that follow.

DETAILED DESCRIPTION

LIDAR systems operate by transmitting a series of light pulses that reflect off objects. The reflected signal, or return signal, is received by the light detection and ranging system. Based on the detected time-of-flight (TOF), the system determines the range/distance between the system and the object.

Figure 1:
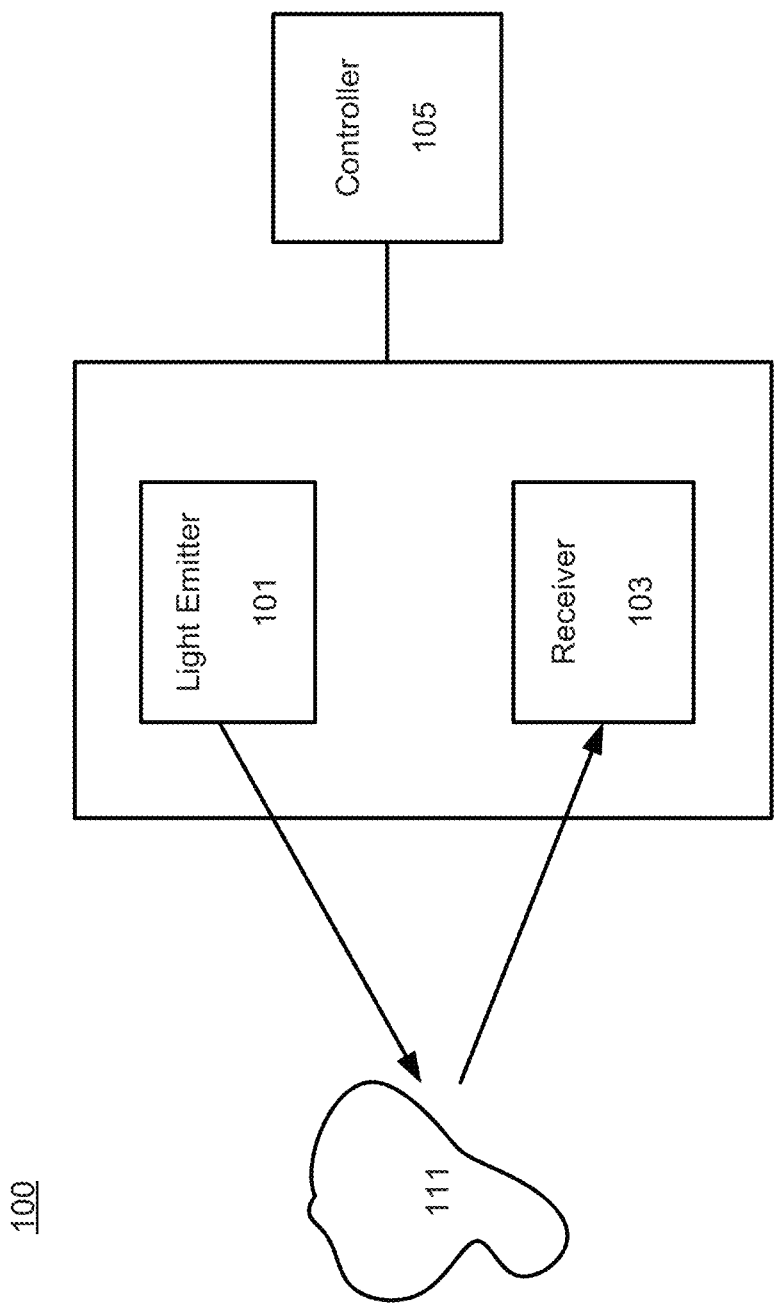
FIG. 1 illustrates an example schematic diagram of a LIDAR sensor in accordance with the present technology.

FIG. 1 illustrates an example schematic diagram of a LIDAR sensor 100 in accordance with the present technology. The LIDAR sensor 100 includes a light emitter 101 that emits a light signal to an object 111 in an external environment and a receiver 103 that receives the return signal reflected by an object 111. In some embodiments, the LIDAR sensor 100 adopts a beam steering mechanism to steer the light signal to the object 111. In some embodiments, the LIDAR sensor 100 can be configured to rotate around an axis to achieve a larger field of view (e.g., a 360-degree horizontal field of view). The receiver 103 may include an analog-to-digital (A2D) convertor (not shown) that converts the return signal to a corresponding electrical signal. In some embodiments, the LIDAR sensor 100 may optionally include a controller 105. In some embodiments, the controller is a part of the LIDAR systems. The controller 105 is in communication with both the light emitter 101 and the receiver 103 so that the controller 105 can control light emissions by the light emitter 101 and process the electrical signals from the receiver 103. In some embodiments, the controller 105 uses a set of points, such as a point cloud, based on the captured distances to represent at least a partial surface the object 111 in the environment. The points in the point cloud can represent or indicate surface features of the object 111.

Figure 2:
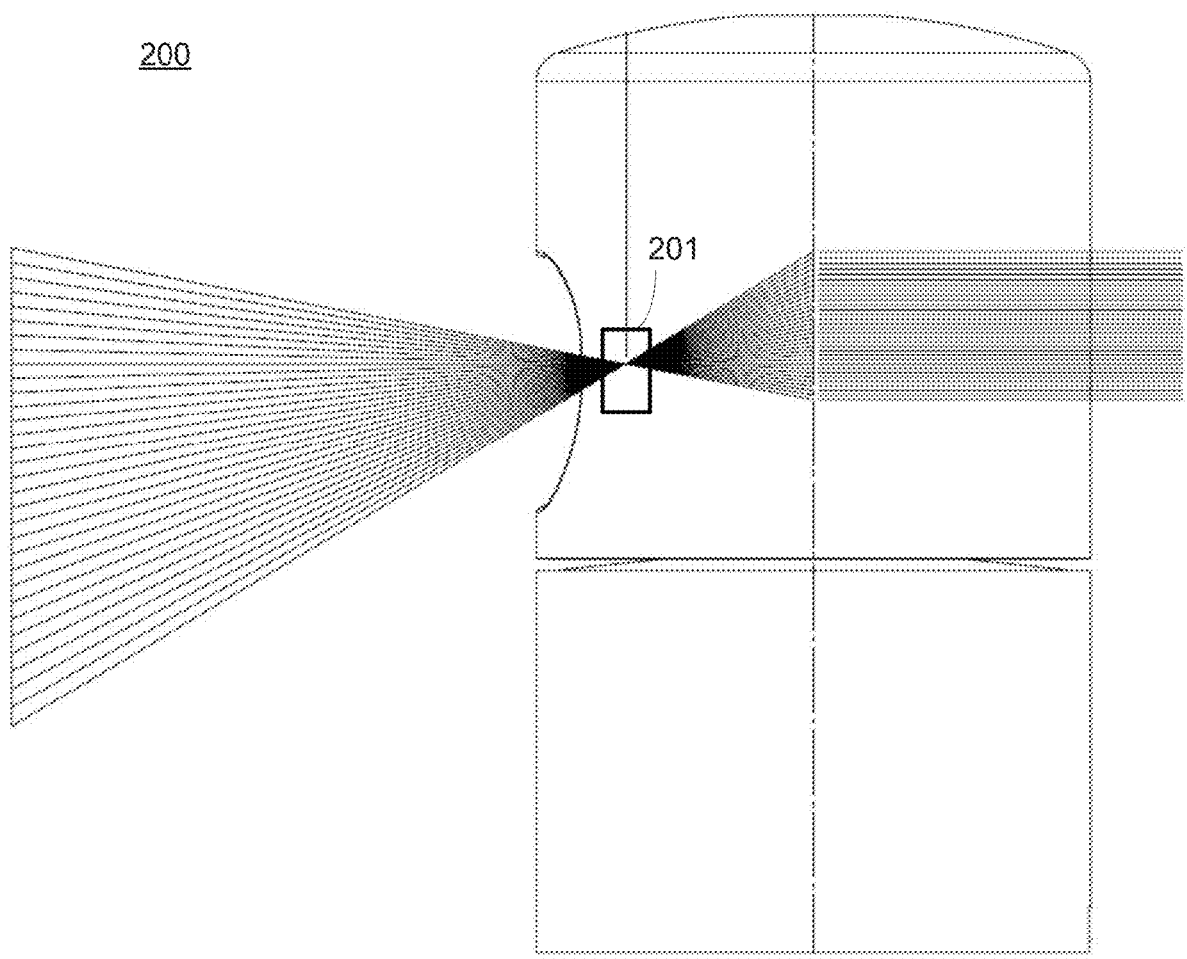
FIG. 2 illustrates an example schematic diagram of a LIDAR system in accordance with the present technology.
Figure 3:
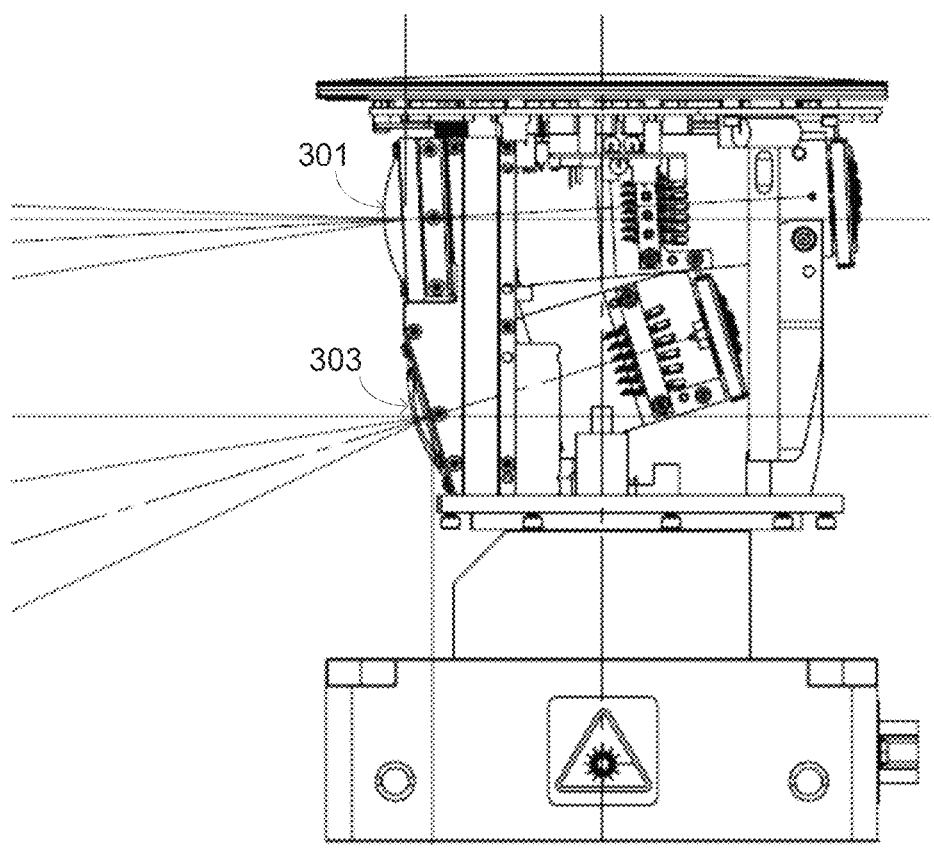
FIG. 3 illustrates another example schematic diagram of a LIDAR system in accordance with the present technology.

In some embodiments, the light emitter 101 can emit multiple light beams. FIG. 2 illustrates an example schematic diagram of a LIDAR system 200 in accordance with the present technology. The LIDAR system 200 includes a LIDAR sensor 201 that emits a plurality of beams over an angular range. In this particular example, the light emitter can emit 32 beams of light (also referred to as 32 channels). In some embodiments, the LIDAR system includes multiple LIDAR sensors to obtain a dense set of data for an accurate representation of the object. FIG. 3 illustrates an example schematic diagram of a LIDAR system 300 in accordance with the present technology. The LIDAR system 300 depicted in this example includes a first LIDAR sensor 301 and a second LIDAR sensor 303. Both of the sensors are capable of emitting multiple light beams. Because the sensors are positioned in proximity to each other within a single LIDAR system, crosstalk interference among the sensors can occur. Furthermore, with an increasing number of autonomous vehicles equipped with LIDAR systems to detect and avoid obstacles in the environment, direct interference among multiple LIDAR sensors may occur. The reception of foreign light signals can lead to problems such as ghost targets or a reduced signal-to-noise ratio. Disclosed herein are techniques that can be implemented in various embodiments to reduce or minimize the impact of interference among multiple LIDAR sensors, thereby providing a more reliable model to represent the environment for safe maneuvering.

Figure 4:
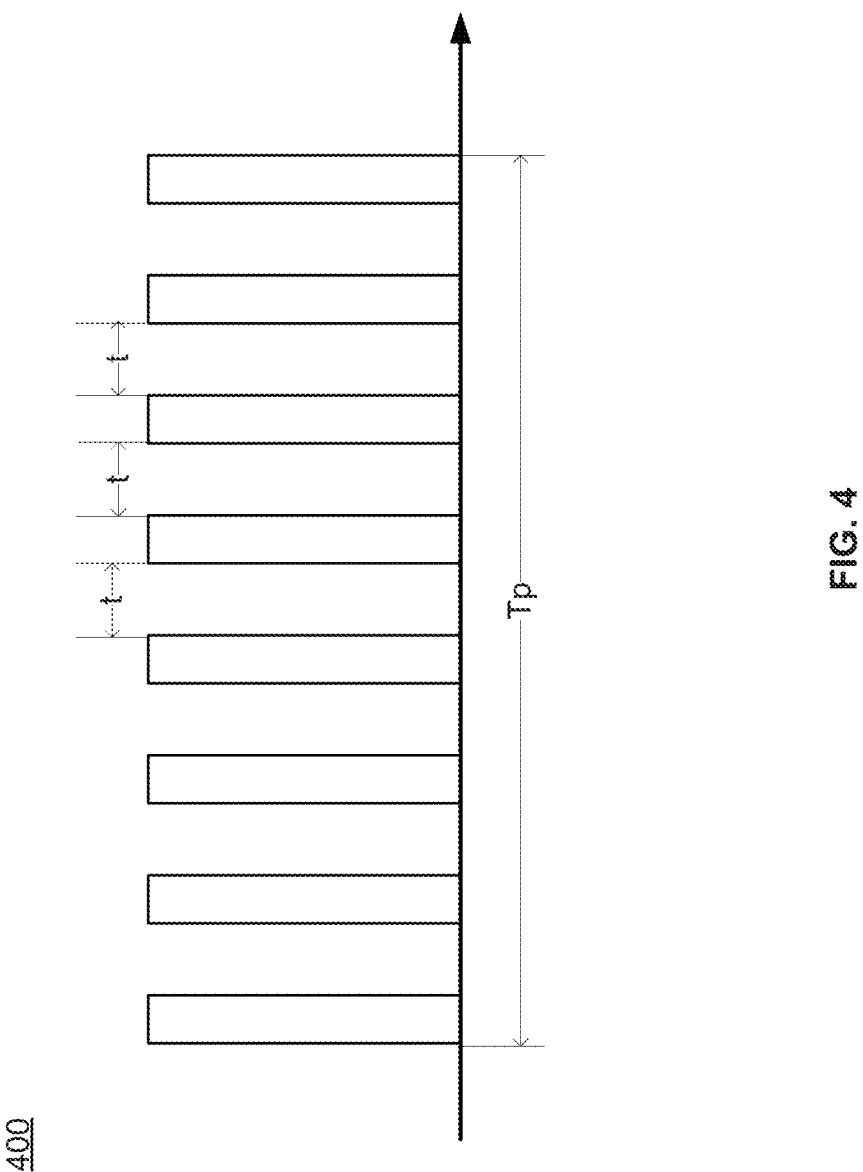
FIG. 4 depicts an example pulse signal generated by a controller.
Figure 5A:
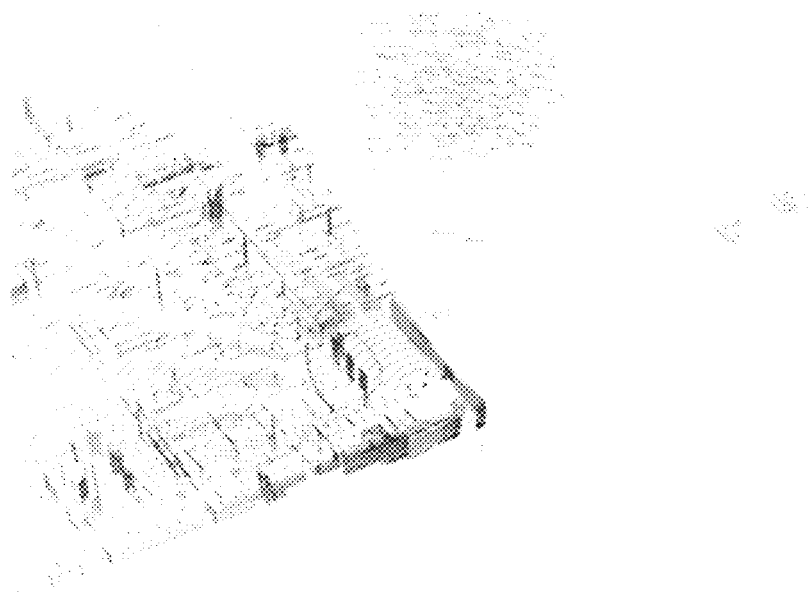
FIG. 5A illustrates an example interference pattern that appears in a point cloud.
Figure 5B:
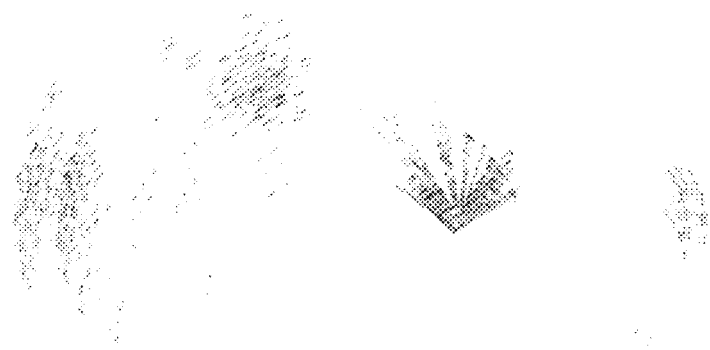
FIG. 5B illustrates an example interference pattern that appears in a point cloud.

In some LIDAR systems, the light emitter generates pulsed light emissions in response to a pulse electrical signal provided by the controller. FIG. 4 depicts an example pulse electrical signal 400 generated by a controller. The pulse signal 400 includes multiple uniformly or non-uniformly spaced pulses. For example, the pulses can be uniformly distributed in a period of time $T_p$. That is, adjacent pulses are separated by the same distance of t in the time domain. As discussed above, when there are multiple light beams generated according to the same pulse signal, direct or crosstalk interference among the signals is likely to occur. For example, for multi-sensor LIDAR systems, inter-sensor interference can happen, which includes direct interference when sensors are pointing at each other and indirect interference when signals from multiple sensors bounce off the object(s). For single-sensor multi-beam LIDAR systems, intra-sensor interference can happen. Signals from multiple beams can bounce off the object(s) and form an interference pattern. When signals at the same time-domain location interfere, the resulting interference may be transformed into ghost targets that are located at approximately the same distance from the LIDAR sensor. FIGS. 5A-B illustrate example interference patterns that can appear in a point cloud. In these examples, the interference can appear as a curved surface in the point cloud data set. The curve surface can be interpreted as a real obstacle in the environment, thereby severely impacting computations of the controller and subsequent navigation of the vehicle that carries the LIDAR system.

Figure 6:
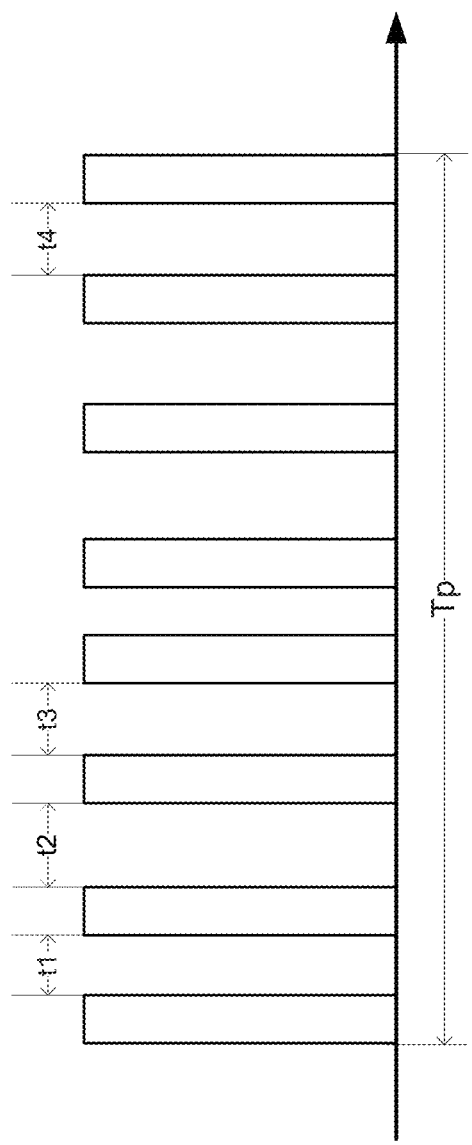
FIG. 6 illustrates an example dithered pulse signal in accordance with the present technology.

One way to minimize the impact of such interference is to distribute the interference signals across the field of view of the LIDAR sensor. If the interference shows up as small ghost points located at various distances from the LIDAR sensor, there is a lower probability for the controller to interpret these signals as a solid obstacle. Instead of generating pulses that are uniformly spaced in the time domain, the controller can control the light emitter to "dither" the pulse signal so that the firing time of the pulses is randomized in the period $T_p$. FIG. 6 illustrates an example dithered pulse signal in accordance with the present technology. A randomized $\Delta t_{random}$ can be added or subtracted from t for each firing of the pulse. Thus, the adjacent pulses are separated by different distances ($t \pm \Delta t_{random}$) in the time domain. For example, $\Delta t_{random}$ can be generated by a pseudo-random generation algorithm. In some embodiments, $\Delta t_{random}$ is up to around 1 μs. In the specific example shown in FIG. 6, $t_1 = t \pm \Delta t_{random1}$, $t_2 = t \pm \Delta t_{random2}$, $t_3 = t \pm \Delta t_{random3}$, and $t_1 \neq t_2 \neq t_3$. Due to the nature of pseudo-random generation, occasionally two adjacent pulses may have the same spacing as compared to two pulses in another sequence. For example, $t_4$ in FIG. 6 can be equal to t in FIG. 4. However, the time-domain spacings of the pulses are sufficiently different due to the randomization so that the interference, when it does occur, is distributed in distance to form a more uniform noise pattern.

In some embodiments, the firing sequence can be dynamically re-ordered to allow a larger range of $\Delta t_{random}$. In some embodiments, the dithering techniques as described herein can be combined with a pulse signal signature, described in U.S. Pub. No. 2019/0178991, the entire content of which is incorporated by reference as part of the disclosure of this patent document to further reduce or minimize the impact of interference. For example, each pulse signal can be given a pulse signal signature. In some embodiments, each pulse signal has a unique signature to ensure the security and reliability of the generated data. In some embodiments, the number of unique signatures available to the LIDAR sensor (also referred to as the code base) may be limited by various factors. Given a small code base, two LIDAR sensors may have the same signature at the same time, leading to an interference pattern such as shown in FIG. 5. Combining the dithering techniques with a code base of unique pulse signatures can greatly reduce the likelihood of signal interference by two LIDAR sensors sharing the same pulse signal.

Figure 7:
FIG. 7 illustrates an example interference pattern after dithering the pulse signal in accordance with the present technology.

FIG. 7 illustrates an example interference pattern after dithering the pulse signal in accordance with the present technology. As shown in FIG. 7, the interference is more uniformly distributed to resemble a white noise pattern. The controller now can apply a filtering process to remove the points that are deemed as interference.

Figure 8:
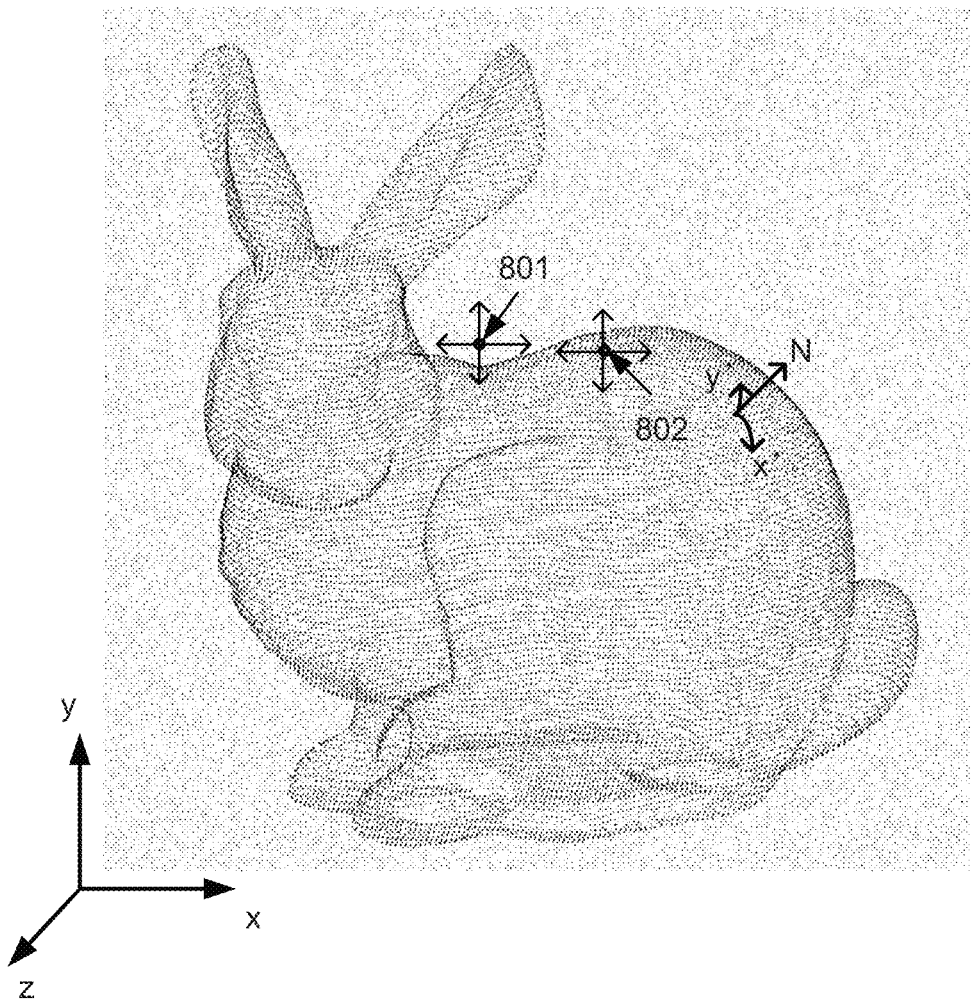
FIG. 8 illustrates an example of a filtering process in accordance with the present technology.

FIG. 8 illustrates an example of a filtering process in accordance with the present technology. In FIG. 8, a set of points has been collected to represent an object or at least a partial surface of the object in the environment. The collected points also include a significant amount of interference showing as noise. In order to determine whether a particular point is interference/noise or actual data representing the object, the controller can check information carried in the neighboring points to determine whether there is a coherency among the points.

In some embodiments, the points in the point cloud dataset are represented using a Cartesian coordinate system. Information carried by the neighboring points in x, y, and/or z directions, such as the location or the color, can be used to determine whether the point and its neighbors represent the same surface. For example, as shown in FIG. 8, point 801 can be checked against its neighboring points in x, y, and/or z directions. The neighboring points along x direction of point 801 do not provide sufficient information because they also appear to be noise. However, the neighboring points along y direction of point 801 indicate that there is no coherence between point 801 and some of the neighbors; they appear to represent two separate surfaces. Point 801 can thus be filtered out as a noise point. Similarly, point 802 can be checked against its neighboring points. The neighboring points along both x and y directions indicate that there exists a coherence between point 802 and its neighbors. Thus, point 802 remains in the model.

In some embodiments, the points in the point cloud carry a normal vector N indicating an estimated surface normal of the object. Based on the normal vector N, two substantially orthogonal directions x' and y' can be determined. Information carried by the neighboring points in x' and y' can be used to determine whether the point and its neighbor represent the same surface. For example, in some embodiments, each point carries color information. If the point has the same color as its neighboring points (or if the color difference is equal to or less to a predefined threshold), a point coherence exists. As another example, if a distance between the point and its neighboring point exceeds a predefined threshold, the controller can determine that there is no coherence between the point and its neighbors. When there is no coherence between a point and its neighbors, the point is removed or filtered from the model as noise.

Examining neighboring points in two or more directions can provide a more reliable determination of the point coherence when the object has a sharp surface feature or a small dimension along one direction. For example, if the object is a thin, long pole, examining points along the x direction in the Cartesian coordinate system may not provide sufficient amount of information because there are only a few surface points available. Examining points along the y direction, however, allows the system to use more surface points of the pole to determine whether a coherence exists between the target point (potentially a noise point) and the object.

In some embodiments, a bounding box is placed around the target point. The spatial neighbors of the target point generated by prior and/or next signals from the same channel or concurrent/prior/next signals from a vertically adjacent channel are examined. If the distance between a neighboring point and the target point is equal to or less than a threshold, the target point can be considered as a coherent point to the neighboring point. Other factors, such as color of the object, reflectivity of the object, strength of the signal, and signal to noise ratio (SNR) of the signal are also considered to determine the coherence. In some implementations, when the number of coherent points in the bounding box exceeds a predetermine threshold (e.g., nine neighboring returns), the target point is considered a valid data point instead of noise/interference.

In some embodiments, to obtain optimal real-time performance, the LIDAR sensor may track a small set of points in the point cloud dataset instead of the entire dataset for the object(s) in the environment. Thus, instead of filtering the entire dataset at once, the LIDAR sensor or a filtering subsystem of the LIDAR sensor performs real-time filtering. The real-time filtering can be performed to one object within a selected few frames, or multiple objects within one frame. The controller or the filtering subsystem can also make certain assumptions about the object (e.g., smoothness, color, location, size) to facilitate real-time filtering of the noise/interference points.

In some implementations, a confidence of validity of the filtering process can be derived based on the number of coherent points in the bounding box. As discussed above, the LIDAR sensors can emit multiple sets of signals concurrently. A combination of the dithering pattern (e.g., the burstiness of multiple channels) and a low confidence of validity in the filtering process can be used together to indicate whether the target point is a result of direct or crosstalk interference.

Figure 9:
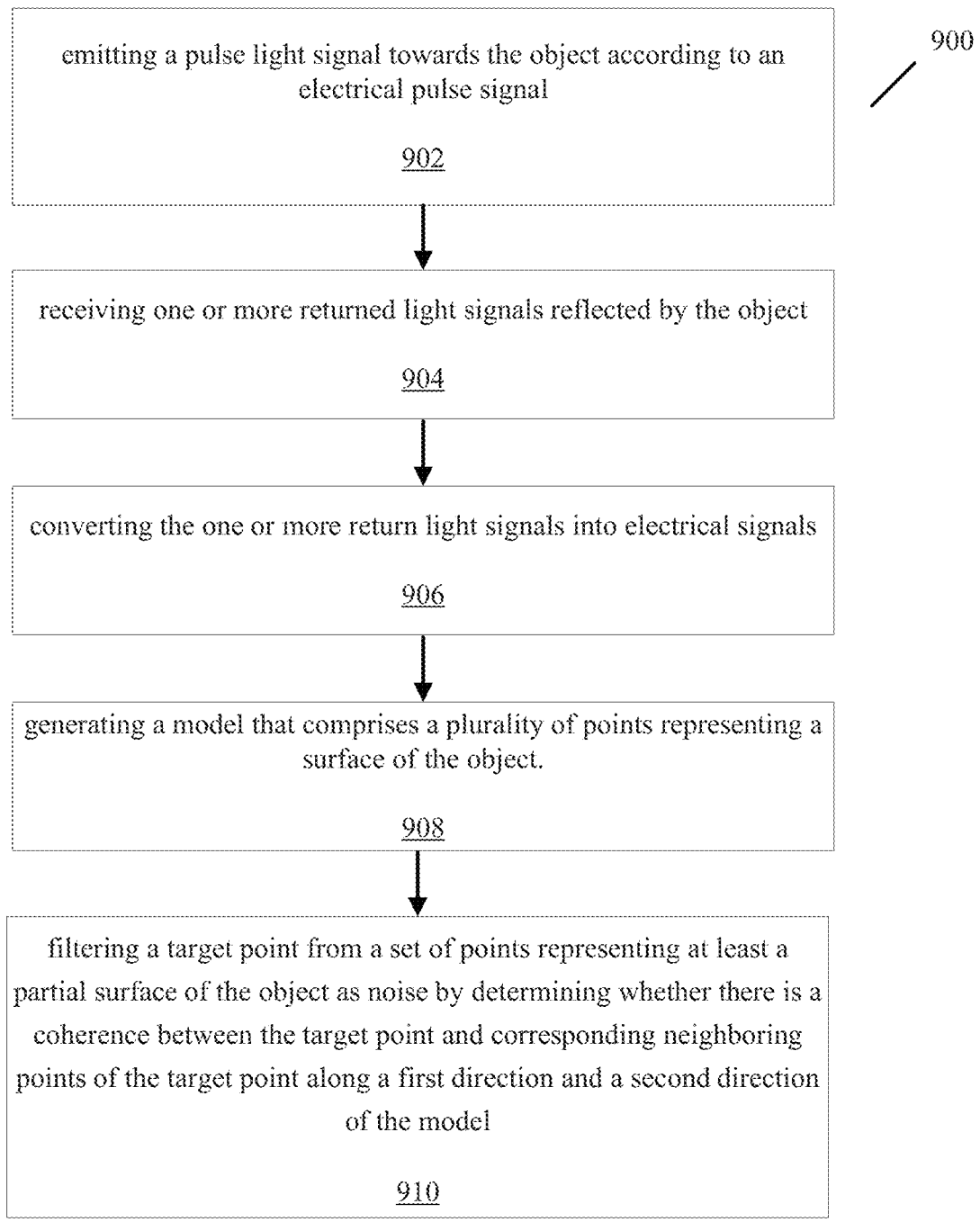
FIG. 9 is a flowchart representation of a method for sensing an object in an external environment using a light detection and ranging device in accordance with the present technology.

FIG. 9 is a flowchart representation of a method 900 for sensing an object in an external environment using a light detection and ranging device in accordance with the present technology. The method 900 includes, at operation 902, emitting, by a light emitter of the light detection and range device, a pulse light signal towards the object according to an electrical pulse signal. The electrical pulse signal comprises a first set of non-uniformly spaced pulses. The method 900 includes, at operation 904, receiving, by a receiver of the light detection and range device, one or more returned light signals reflected by the object. The method 900 includes, at operation 906, converting, by the receiver, the one or more return light signals into electrical signals. The method 900 includes, at operation 908, generating, based on the electrical signals, a model that comprises a plurality of points representing a surface of the object. The method 900 includes, at operation 910, filtering a target point from a set of points representing at least a partial surface of the object as noise by determining whether there is a coherence between the target point and corresponding neighboring points of the target point along a first direction and a second direction of the model.

Figure 10:
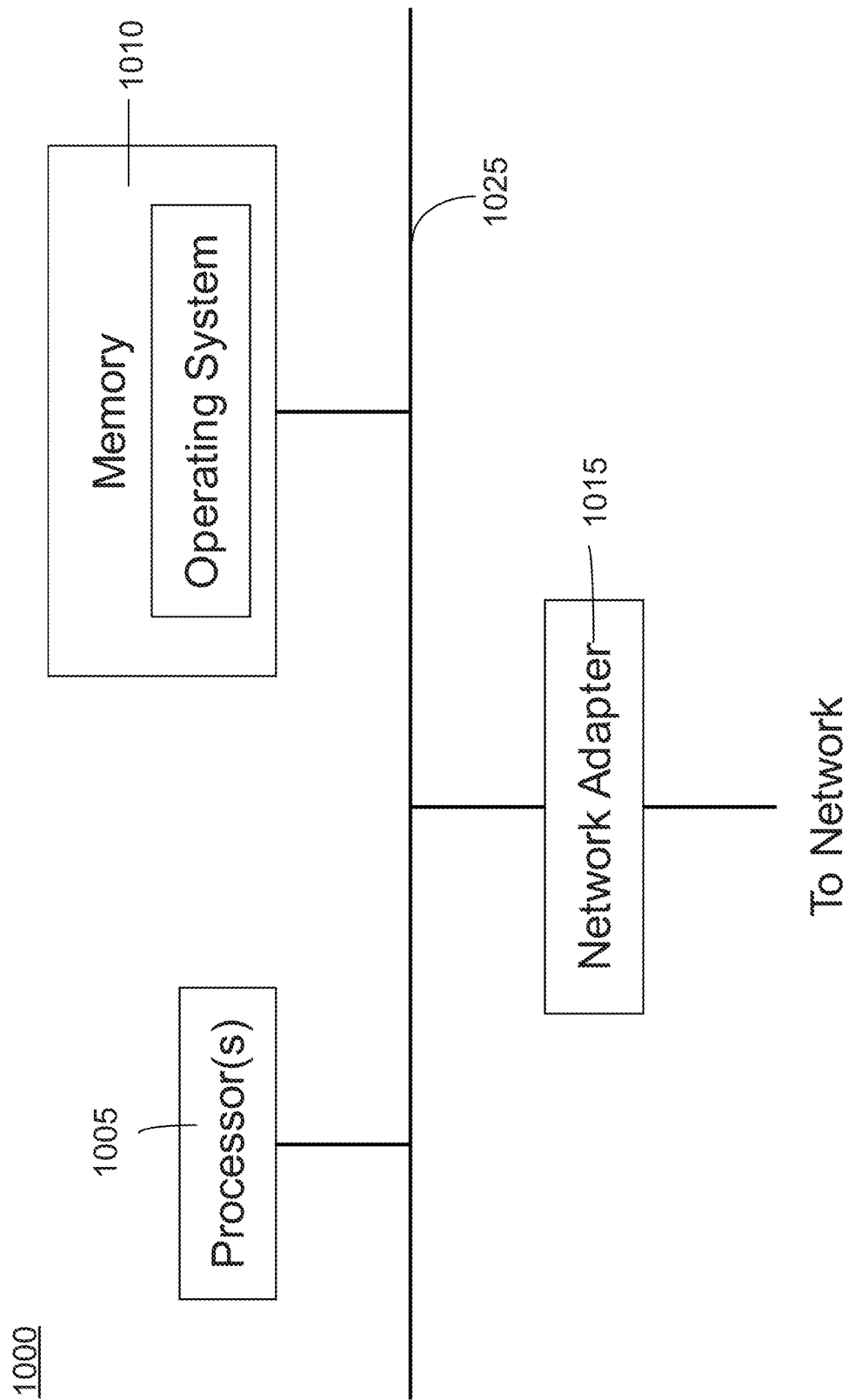
FIG. 10 is a block diagram illustrating an example of the architecture for a computer system or other control device that can be utilized to implement various portions of the presently disclosed technology.

FIG. 10 is a block diagram illustrating an example of the architecture for a computer system or other control device 1000 that can be utilized to implement various portions of the presently disclosed technology, such as the controller 105 shown in FIG. 1. In FIG. 10, the computer system 1000 includes one or more processors 1005 and memory 1010 connected via an interconnect 1025. The interconnect 1025 may represent any one or more separate physical buses, point to point connections, or both, connected by appropriate bridges, adapters, or controllers. The interconnect 1025, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 1005 may include central processing units (CPUs) to control the overall operation of, for example, the host computer. In certain embodiments, the processor(s) 1005 accomplish this by executing software or firmware stored in memory 1010. The processor(s) 1005 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1010 can be, or include, the main memory of the computer system. The memory 1010 represents any suitable form of random-access memory (RAM), read-only memory (ROM), flash memory, or the like, or a combination of such devices. In use, the memory 1010 may contain, among other things, a set of machine instructions which, when executed by processor 1005, causes processor 1005 to perform operations to implement embodiments of the presently disclosed technology.

Also connected to the processor(s) 1005 through the interconnect 1025 is a (optional) network adapter 1015. The network adapter 1015 provides the computer system 1000 with the ability to communicate with remote devices, such as the storage clients, and/or other storage servers, and may be, for example, an Ethernet adapter or Fiber Channel adapter.

It is thus evident that the disclosed techniques can be implemented in various embodiments to effectively reduce the impact of signal interferences in LIDAR sensors and systems. In one example aspect, a light detection and ranging apparatus includes a light emitter configured to generate, according to a first electrical pulse signal, a pulse light signal that is directed toward an object in an external environment. The first electrical pulse signal comprises a first set of non-uniformly spaced pulses. The apparatus includes a receiver configured to receive one or more returned light signals reflected by the object and convert the returned light signals into electrical signals and a filtering subsystem in communication with the receiver. The filtering subsystem is configured to receive the electrical signals from the receiver and remove a point from a set of points representing at least a partial surface of the object as noise by determining whether there is a coherence between the point and corresponding neighboring points of the point along at least a first direction and a second direction of the set of points.

In some embodiments, two adjacent pulses of the first set of pulses are separated by a randomized distance in time domain. In some embodiments, the light emitter is configured to generate a second pulse light signal according to a second electrical pulse signal, wherein the second electrical pulse signal comprises a second set of non-uniformly spaced pulses, and wherein at least one pulse in the second set of pulses is positioned at a different time-domain location than a corresponding pulse in the first set of pulses. In some embodiments, the light emitter is configured to generate a third pulse light signal according to a third electrical pulse signal, wherein the third electrical pulse signal comprises a third set of non-uniformly spaced pulses, and wherein no pulse in the third set of pulses shares a same time-domain location as any pulse in the first set of pulses. In some embodiments, each of the first, second, and third electrical pulse signal comprises a pulse signature. The pulse signature can be unique for each of the first, second, and third electrical pulse signal.

In some embodiments, each point carries information about a vector that indicates an estimated surface normal of the object, and wherein the first direction and the second direction are determined based on the vector. In some embodiments, the first direction and the second direction are two directions in a Cartesian coordinate system.

In some embodiments, determining the coherence between the point and the corresponding neighboring points comprises examining information carried in the neighboring points of the point and determining whether the point and the neighboring points both represent the surface of the same object. In some embodiments, the information carried in a neighboring point includes at least a location of the neighboring point or a color of the neighboring point.

In another example aspect, a method for sensing an object in an external environment using a light detection and ranging device includes emitting, by a light emitter of the light detection and range device, a pulse light signal towards the object according to an electrical pulse signal, the electrical pulse signal comprising a first set of non-uniformly spaced pulses. The method includes receiving, by a receiver of the light detection and range device, one or more returned light signals reflected by the object and converting, by the receiver, the one or more return light signals into electrical signals. The method also includes filtering a target point from a set of points representing at least a partial surface of the object as noise by determining whether there is a coherence between the target point and corresponding neighboring points of the target point along a first direction and a second direction of the model.

In some embodiments, two adjacent pulses of the first set of pulses are separated by a randomized distance in time domain. In some embodiments, the method includes emitting a second pulse light signal according to a second electrical pulse signal. The second electrical pulse signal comprises a second set of non-uniformly spaced pulses and at least one pulse in the second set of pulses is positioned at a different time-domain location than a corresponding pulse in the first set of pulses. In some embodiments, the method includes emitting a third pulse light signal according to a third electrical pulse signal. The third electrical pulse signal comprises a third set of non-uniformly spaced pulses and no pulse in the third set of pulses shares a same time-domain location as any pulse in the first set of pulse. In some embodiments, each of the first, second, and third electrical pulse signal comprises a pulse signature. The pulse signature can be unique for each of the first, second, and third electrical pulse signal.

In some embodiments, each point carries information about a vector that indicates an estimated surface normal of the object. The method includes determining two orthogonal directions as the first direction and the second direction based on the vector. In some embodiments, the method includes selecting two orthogonal directions in a Cartesian coordinate system as the first direction and the second direction.

In some embodiments, determining the coherence between the target point and the corresponding neighboring points includes examining information carried in the neighboring points of the target point and determining whether the target point and the neighboring points both represent the surface of the same object. In some embodiments, the information carried in a neighboring point includes a location of the neighboring point. In some embodiments, the method can include filtering out the target point upon determining that a distance between the neighboring point and the target point exceeds a predefined threshold. In some embodiments, the information carried in a neighboring point includes a color of the neighboring point. The method can include filtering out the target point upon determining that a color difference between the neighboring point and the target point exceeds a predefined threshold.

In some embodiments, filtering the target point comprises constructing a bounding box for the target point, determining a number of neighboring points that are coherent with the target point, and filtering out the target point upon determining that the number of coherent neighboring points is equal to or smaller than a predefined threshold.

In another example aspect, a non-transitory computer readable medium having processor code stored thereon including program code for performing a method that comprises emitting, by a light emitter of the light detection and range device, a pulse light signal towards the object according to an electrical pulse signal, the electrical pulse signal comprising a first set of non-uniformly spaced pulses. The method includes receiving, by a receiver of the light detection and range device, one or more returned light signals reflected by the object and converting, by the receiver, the one or more return light signals into electrical signals. The method also includes filtering a target point from a set of points representing at least a partial surface of the object as noise by determining whether there is a coherence between the target point and corresponding neighboring points of the target point along a first direction and a second direction of the model.

In some embodiments, two adjacent pulses of the first set of pulses are separated by a randomized distance in time domain. In some embodiments, determining the coherence between the target point and the corresponding neighboring points comprises examining information carried in the neighboring points of the target point and determining whether the target point and the neighboring points both represent the surface of the same object. In some embodiments, the information carried in a neighboring point includes at least a location of the neighboring point or a color of the neighboring point. In some embodiments, filtering the target point comprises constructing a bounding box for the target point, determining a number of neighboring points that are coherent with the target point, and filtering out the target point upon determining that the number of coherent neighboring points is equal to or smaller than a predefined threshold.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including, by way of example, a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory, or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including, by way of example, semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only where exemplary means an example. As used herein, the singular forms "a," "an," and "the" are intended to include the plural forms as well, unless the context clearly indicates otherwise. Additionally, the use of "or" is intended to include "and/or," unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document, in the context of separate embodiments, can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A light detection and ranging apparatus, comprising:
   a light emitter configured to generate, according to a first electrical pulse signal, a pulse light signal that is directed toward an object in an external environment, the first electrical pulse signal comprising a first set of non-uniformly spaced pulses;
   a receiver configured to receive one or more returned light signals reflected by the object and convert the returned light signals into electrical signals; and
   a filtering subsystem in communication with the receiver, configured to:
      receive the electrical signals from the receiver, and
      remove a point from a set of points representing at least a partial surface of the object as noise by determining whether there is a coherence between the point and corresponding neighboring points of the point along at least a first direction and a second direction of the set of points.

2. The apparatus of claim 1, wherein two adjacent pulses of the first set of pulses are separated by a randomized distance in time domain.

3. The apparatus of claim 1, wherein the light emitter is configured to generate a second pulse light signal according to a second electrical pulse signal, wherein the second electrical pulse signal comprises a second set of non-uniformly spaced pulses, and wherein at least one pulse in the second set of pulses is positioned at a different time-domain location than a corresponding pulse in the first set of pulses.

4. The apparatus of claim 1, wherein the light emitter is configured to generate a third pulse light signal according to a third electrical pulse signal, wherein the third electrical pulse signal comprises a third set of non-uniformly spaced pulses, and wherein no pulse in the third set of pulses shares a same time-domain location as any pulse in the first set of pulses.

5. The apparatus of claim 4, wherein each of the first, second, and third electrical pulse signal comprises a pulse signature.

6. The apparatus of claim 5, wherein the pulse signature is unique for each of the first, second, and third electrical pulse signal.

7. The apparatus of claim 1, wherein each point carries information about a vector that indicates an estimated surface normal of the object, and wherein the first direction and the second direction are determined based on the vector.

8. The apparatus of claim 1, wherein the first direction and the second direction are two directions in a Cartesian coordinate system.

9. The apparatus of claim 1, wherein determining the coherence between the point and the corresponding neighboring points comprises:
   examining information carried in the neighboring points of the point; and
   determining whether the point and the neighboring points both represent the surface of the same object.

10. The apparatus of claim 1, wherein the information carried in a neighboring point includes at least a location of the neighboring point or a color of the neighboring point.

11. A method for sensing an object in an external environment using a light detection and ranging device, comprising:
emitting, by a light emitter of the light detection and range device, a pulse light signal towards the object according to an electrical pulse signal, the electrical pulse signal comprising a first set of non-uniformly spaced pulses;
receiving, by a receiver of the light detection and range device, one or more returned light signals reflected by the object;
converting, by the receiver, the one or more return light signals into electrical signals; and
filtering a target point from a set of points representing at least a partial surface of the object as noise by determining whether there is a coherence between the target point and corresponding neighboring points of the target point along a first direction and a second direction of the model.

12. The method of claim 11, wherein two adjacent pulses of the first set of pulses are separated by a randomized distance in time domain.

13. The method of claim 11, comprising:
emitting a second pulse light signal according to a second electrical pulse signal, wherein the second electrical pulse signal comprises a second set of non-uniformly spaced pulses, and wherein at least one pulse in the second set of pulses is positioned at a different time-domain location than a corresponding pulse in the first set of pulses.

14. The method of claim 11, comprising:
emitting a third pulse light signal according to a third electrical pulse signal, wherein the third electrical pulse signal comprises a third set of non-uniformly spaced pulses, and wherein no pulse in the third set of pulses shares a same time-domain location as any pulse in the first set of pulse.

15. The method of claim 14, wherein each of the first, second, and third electrical pulse signal comprises a pulse signature.

16. The method of claim 15, wherein the pulse signature is unique for each of the first, second, and third electrical pulse signal.

17. The method of claim 11, wherein each point carries information about a vector that indicates an estimated surface normal of the object, and wherein the method comprises:
determining two orthogonal directions as the first direction and the second direction based on the vector.

18. The method of claim 11, comprising:
selecting two orthogonal directions in a Cartesian coordinate system as the first direction and the second direction.

19. The method of claim 11, wherein determining the coherence between the target point and the corresponding neighboring points comprises:
examining information carried in the neighboring points of the target point; and
determining whether the target point and the neighboring points both represent the surface of the same object.

20. The method of claim 11, wherein the information carried in a neighboring point includes a location of the neighboring point.

21. The method of claim 20, comprising:
filtering out the target point upon determining that a distance between the neighboring point and the target point exceeds a predefined threshold.

22. The method of claim 11, wherein the information carried in a neighboring point includes a color of the neighboring point.

23. The method of claim 22, comprising:
filtering out the target point upon determining that a color difference between the neighboring point and the target point exceeds a predefined threshold.

24. The method of claim 11, wherein filtering the target point comprises:
constructing a bounding box for the target point;
determining a number of neighboring points that are coherent with the target point; and
filtering out the target point upon determining that the number of coherent neighboring points is equal to or smaller than a predefined threshold.

25. A non-transitory computer readable medium having processor code stored thereon including program code for performing a method that comprises:
emitting, by a light emitter of the light detection and range device, a pulse light signal towards the object according to an electrical pulse signal, the electrical pulse signal comprising a first set of non-uniformly spaced pulses;
receiving, by a receiver of the light detection and range device, one or more returned light signals reflected by the object;
converting, by the receiver, the one or more return light signals into electrical signals; and
filtering a target point from a set of points representing at least a partial surface of the object as noise by determining whether there is a coherence between the target point and corresponding neighboring points of the target point along a first direction and a second direction of the model.

26. The non-transitory computer readable medium of claim 25, wherein two adjacent pulses of the first set of pulses are separated by a randomized distance in time domain.

27. The non-transitory computer readable medium of claim 25, wherein determining the coherence between the target point and the corresponding neighboring points comprises:
examining information carried in the neighboring points of the target point; and
determining whether the target point and the neighboring points both represent the surface of the same object.

28. The non-transitory computer readable medium of claim 25, wherein the information carried in a neighboring point includes at least a location of the neighboring point or a color of the neighboring point.

29. The non-transitory computer readable medium of claim 25, wherein filtering the target point comprises:
constructing a bounding box for the target point;
determining a number of neighboring points that are coherent with the target point; and
filtering out the target point upon determining that the number of coherent neighboring points is equal to or smaller than a predefined threshold.

* * * * *